US008232769B2

(12) United States Patent
Paczkowski

(10) Patent No.: US 8,232,769 B2
(45) Date of Patent: Jul. 31, 2012

(54) PASSIVE BATTERY DISCHARGE DEVICE

(75) Inventor: Henry Paczkowski, Manhassett Hills, NY (US)

(73) Assignee: Bren-Tronics, Inc., Commack, NY (US)

( * ) Notice: Subject to any disclaimer, the term of this patent is extended or adjusted under 35 U.S.C. 154(b) by 389 days.

(21) Appl. No.: 12/488,227

(22) Filed: Jun. 19, 2009

(65) Prior Publication Data
US 2010/0320970 A1    Dec. 23, 2010

(51) Int. Cl.
*H02J 7/00* (2006.01)
(52) U.S. Cl. ........ 320/131; 320/127; 320/135; 320/136; 324/426; 340/636.1; 340/636.21
(58) Field of Classification Search ............. 320/127, 320/131, 135, 136; 324/426; 340/636.1, 340/636.21
See application file for complete search history.

(56) References Cited

U.S. PATENT DOCUMENTS

| | | | |
|---|---|---|---|
| 4,304,991 A | 12/1981 | Weber | |
| 4,407,909 A | 10/1983 | Goebel | |
| 4,578,628 A * | 3/1986 | Siwiak | 320/127 |
| 4,680,527 A * | 7/1987 | Benenati et al. | 320/112 |
| 5,107,196 A | 4/1992 | Agreste, Jr. et al. | |
| 5,185,564 A * | 2/1993 | Miller | 320/127 |
| 5,479,084 A * | 12/1995 | Satsuma et al. | 320/136 |
| 5,651,821 A | 7/1997 | Uchida | |
| 6,900,615 B2 * | 5/2005 | Kamenoff | 320/127 |
| 7,190,147 B2 | 3/2007 | Gileff et al. | |
| 2004/0012374 A1 * | 1/2004 | Kamenoff | 320/135 |
| 2005/0286966 A1 | 12/2005 | Gueret | |
| 2008/0213565 A1 | 9/2008 | Simpson et al. | |

OTHER PUBLICATIONS

Conductive Elastomers. Typical Properties of Silicon Gaskets. Spectrum Control Inc. http://www.specemc.com/docs/emi242.pdf (1 page).
Conductive Elastomers: CHO-SEAL & CHO-SIL Conductive Elastomers. Chomerics. http://www.nedc.com/literature/nedc-chomerics-conductive-elastomers.pdf (7 pages).
Statfree Foam, Conductive. Desco Industries Inc. 2006. http://documents.desco.com/pdf/12100.pdf (2 pages).
Moreau Mkt. & Sales—Electrically Conductive RTV Silicones. Moreau Marketing & Sales. http://www.rmoreau.com/product-specs/tds/MMS-EC.pdf (2 pages).
Plastazote LD50CN—Conductive Low Density Polyethylene Foam Property Data Sheet. Zotefoams. Jan. 2004. http://www.all-spec.com/downloads/712-2935_100507s.pdf (2 pages).

* cited by examiner

*Primary Examiner* — Patrick Assouad
*Assistant Examiner* — Steve T Chung
(74) *Attorney, Agent, or Firm* — Keusey & Associates, P.C.

(57) ABSTRACT

A passive battery discharge apparatus located within a cap. The cap extends over battery contacts to be discharged. The discharge apparatus includes a conductive material with specified volumetric resistivity properties that is formed into a pad. The cap is positioned over the contacts so that the pad touches and spans between the contacts to be discharged. A spring insures good contact between the pad and the battery contacts. A metal heat sink provides added thermal control. The discharge apparatus provides an economical solution to safely transport batteries that are beyond their useful service life by avoiding circuit components in favor of conductive elastomers or conductive foams.

17 Claims, 3 Drawing Sheets

PASSIVE BATTERY DISCHARGE DEVICE

BACKGROUND

1. Technical Field

This disclosure relates to a low cost passive battery discharge device.

2. Description of the Related Art

Two main types of batteries include rechargeable batteries and primary, non-rechargeable batteries. Rechargeable batteries may need to be completely discharged for reconditioning, or for State-of-Charge synchronization purposes. For these applications, battery chargers may include active discharge circuits which monitor the rate of discharge. A stand alone battery discharge device is shown in U.S. Pat. No. 5,107,196, where a resistor and LED provide illumination until the battery has reached a desired discharge state.

Primary batteries often have a requirement to be fully discharged before disposal. Current discharge devices use a fixed resistor or active circuit connected across the battery terminals to discharge the battery. This approach requires the use of relatively expensive connector to mate with the battery, or complicated independent switch mechanisms. U.S. Pat. No. 5,651,821 provides a carousel where batteries rotate through while in contact with a discharge circuit. At the end of the rotation, batteries are ejected to make room for new ones. This system suffers from several drawbacks, because it requires the battery to be retained within the carousel for an indeterminate period of time, and there is no assurance that the ejected batteries are fully discharged. When discharging a single battery, the entire multi-battery carousel must be present, which may be unreasonable in field operations.

U.S. Pat. No. 7,190,147 discloses a circuit and a switch which is isolated from the battery terminals by an insulator. A tab extending outside the container is pulled to remove the insulator, thereby allowing the switch to complete the discharge circuit.

Therefore, a need exists for a low cost, passive battery discharge device which can be issued as a single unit, and remain with the battery indefinitely.

SUMMARY OF THE INVENTION

It is therefore an object of the invention to provide a passive battery discharge device which can remain with the battery to insure safe and complete discharge.

It is another object of the invention to provide a simply designed discharge device that will guarantee operation under a variety of environmental operating conditions.

It is a further object to provide a low cost discharge device by avoiding switches and circuit componentry since the device is utilized at the end of a batteries useful life.

These and other related objects according to the invention are provided in a discharge apparatus for use in a portable power system including a battery having an outer casing with an equipment flange adjacent to the battery contacts and a removable engagement plate which secures to the equipment flange and extends over the battery contacts. A passive battery discharge apparatus is disposed within the cap's receiving zone. The cap is part of a discharge cover which is adapted to secure to the engagement flange. A conductive sponge-like material is disposed within the cap. The conductive material is physically configured as a direct contact spanning pad that is adapted to resiliently press on to the battery contacts. The conductive material is electrically configured as a non-switched compressible element that is adapted to passively and safely discharge the battery. A spring and disc-shaped heat sink are employed to exert a biasing force on the pad-shaped conductive material toward the battery contacts. Conductive elastomers, conductive foam and combinations thereof are utilized.

In an alternate embodiment according to the invention, there is provided an apparatus for passively discharging a battery including a discharge dome adapted to enclose battery contacts to be discharged. A conductive pad is disposed within said discharge dome and is adapted for directly contacting each contact and spanning across said contacts. The conductive pad forms a passive discharge device that is devoid of switches, wires and resistors. The conductive pad is made from a material selected from a conductive elastomer, a conductive foam, and combinations thereof

BRIEF DESCRIPTION OF DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF PREFERRED EMBODIMENTS

These and other objects, features and advantages of the present invention will become apparent from the following detailed description of illustrative embodiments thereof, which is to be read in connection with the accompanying drawings.

The present invention provides a passive device including a conductive material having a spongy consistency that is held under a biasing force against the battery connector terminals to discharge the battery. The device eliminates the need for expensive battery connectors, since the spongy conductive material can be pressed into the terminal hub, and conform to any shape or configuration that the terminals may be in. In a preferred embodiment, the material is a conductive elastomer or conductive foam. Because of its low cost, individual devices can be issued for permanent connection to a primary battery. In other words, the device can travel with the battery to a proper disposal facility, discharging the battery and protecting against accidental arcing along tie way. A locking feature can be incorporated in the device to prevent tampering or accidental removal. The discharge device can incorporate a window, label or flag to identify a date of decommissioning, a date after which the battery can be destroyed/recycled or other informational or safety/hazard or recycling code.

Figure 1:
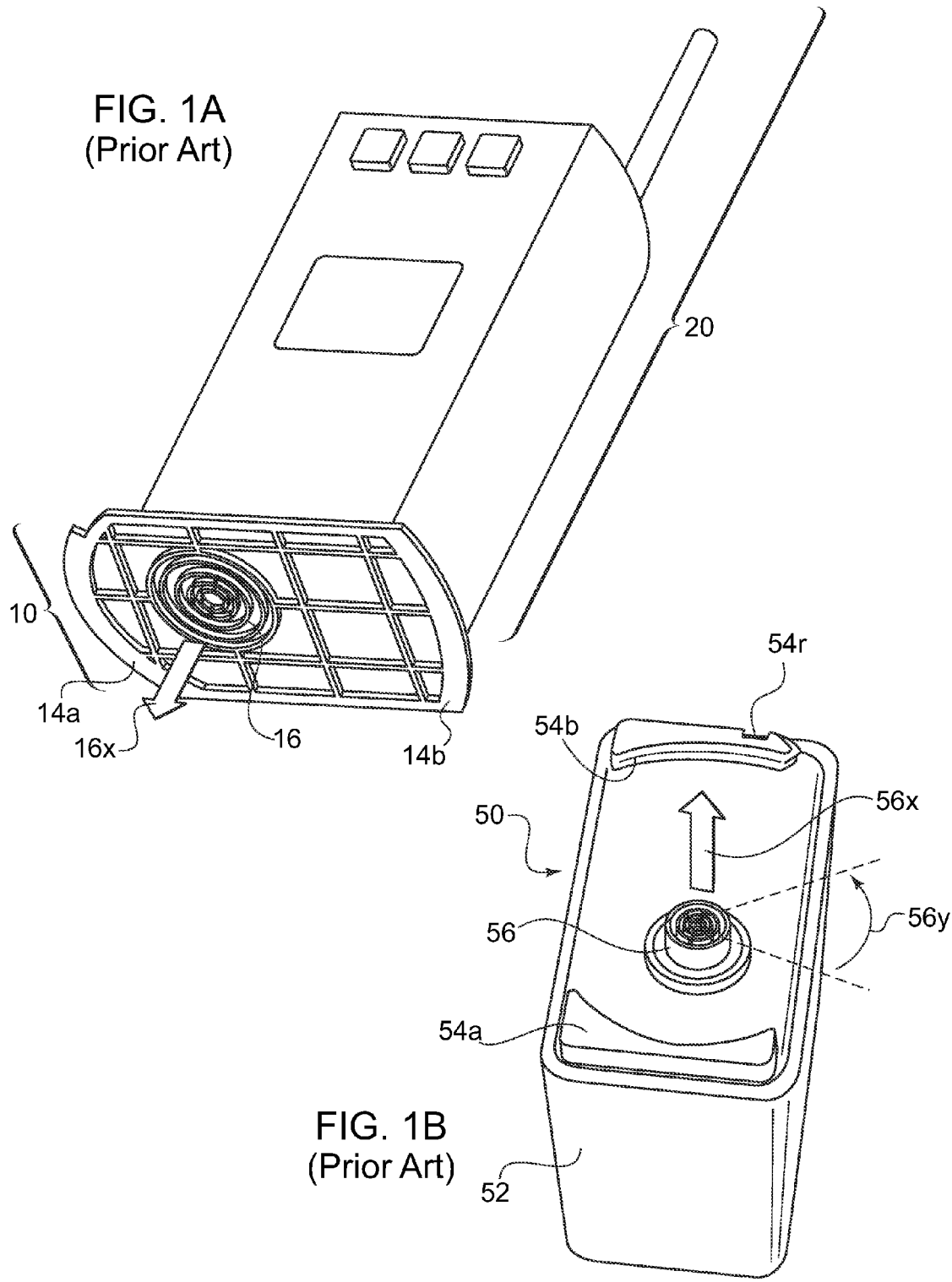
FIG. 1A is a perspective view of a portable electronic device according to the prior art.
FIG. 1B is a perspective view of a battery according to the prior art.

Referring now in specific detail to the drawings in which like reference numerals identify similar or identical elements throughout the several views, and initially to FIGS. 1A and 1B, there is shown a battery 50 and an engagement plate 10 which collectively form a portable power system according to the prior art. Battery 50 includes an outer casing 52, one or more equipment flanges (referred to generically as 54) and contacts 56. Engagement plate 10 includes one or more lip portions (referred to generically as 14) for securing under one or more equipment flanges. For example, diametrically opposed lip portions 14a and 14b can be secured under diametrically opposed flange sections 54a and 54b. Engagement plate further includes a contact zone 16 which is disposed over contacts 56 when the engagement plate is in its installed configuration.

Engagement plate 10 may form the bottom end of a piece of electronic equipment, for example, a radio 20. Engagement plate 10 may also be provided as a thin blank which is used during transport of new batteries to keep dirt and moisture away from contacts 56. As a blank, contact zone 16 is empty. When engagement plate 10 incorporated into an electronic device, contact zone 16 includes mating contacts which will align with contacts 56 on the battery. In the embodiment shown, contacts 56 include two or more concentric rings of individual contacts. In addition to the positive and negative battery terminal, additional contacts may he provided to communicate battery state state of charge, state of health, or other battery usage information to connected equipment. In the concentric embodiment shown, contact zone 16 includes a central axis 16x, which aligns with contact axis 56x of the battery. To install engagement plate 10, contact zone 16 is aligned with contacts 56, and engagement plate 10 is then rotated approximately 90 degrees counter-clockwise, in direction 56y.

In certain applications, battery 50 is a non-rechargeable battery, referred to as a primary battery. At the end of its service life, battery 50 will be destroyed or recycled. However, a problem exists, in that the battery still has residual energy. There are several risks in transporting these "dead" batteries. First, service personnel may confuse the dead batteries with live batteries, and mistakenly take one into the field. Second, dead batteries can still arc causing potential fire hazards, or causing damage to delicate electronic equipment that it may come into contact with. Since primary batteries are never recharged, there is no existing charger that can be equipped with a discharge circuit. Providing a separate discharge circuit is impractical, because the cost of a mating connector assembly is prohibitive.

Figure 2:
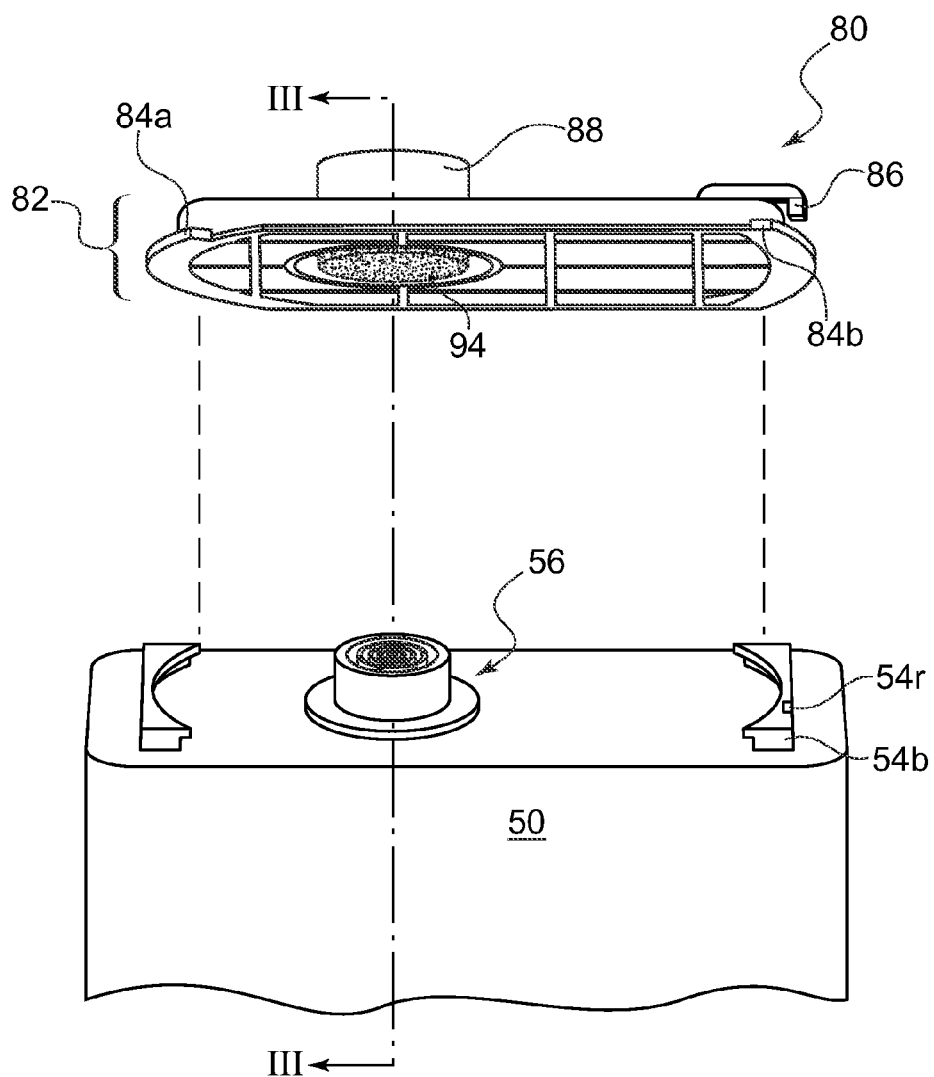
FIG. 2 is a side elevational view of a battery and passive discharge apparatus according to an embodiment of the invention.

As can be seen in FIG. 2, there is provided a discharge apparatus 80 according to one embodiment of the invention, Discharge apparatus 80 includes a incharge cover 82 and a cap 88. Discharge cover 82 includes one or more lip portions for securing under one or more flanges. For example, diametrically opposed lip portions 84a and 84b connect under diametric opposed equipment flanges 54a and 54b. In one embodiment a locking tab 86 is provided in combination with one lip portion. for example lip portion 84b. When discharge cover 82 is rotated in direction 56y, locking tab 86 comes into contact with flange 54b. A ramp forcus locking tab to ride along the top surface of flange 54b until it encounters a recess 54r. Locking tab 86 then snaps back into its original position, being seated in recess 54r, and preventing clockwise rotation. This essentially locks discharge cover 80 onto battery 50. Locking lab 86 can be manufactured with sufficient sufficient so that can be forced along the ramp by mannal pressure. Once locked, tab 86 cannot be unseated manually without destroying part of the cover or the flange. Additional safeguards nuts be employed to insure the discharge cover remains permanently fastened, or to insure that removal is possible only with special tools or keys. References to a discharge apparatus means an apparatus that is designed to harmlessly dissipate power or energy, i.e. an energy discharge apparatus.

Figure 3:
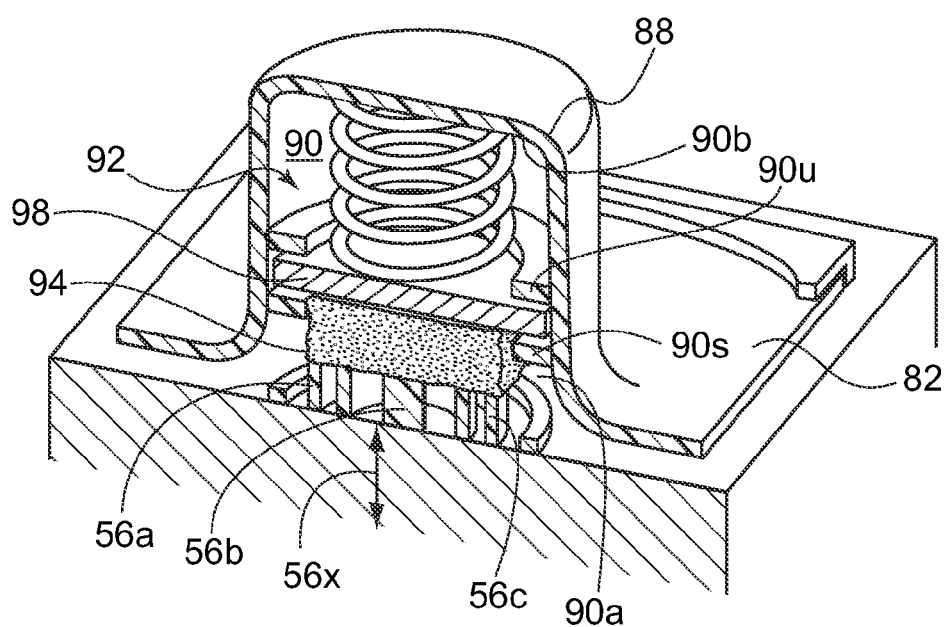
FIG. 3 is a cross-sectional view, taken along the line III-III from FIG. 2.

As can be seen in FIG. 3, cap 88 is being installed over contacts 56. Cap 88 serves as a discharge dome to completely enclose contacts 56. A passive battery discharge apparatus 92 is disposed within the cap's internal receiving zone 90, which consists of ail open proximal end 90a and a closed distal end 90b. The essential component of discharge apparatus 92 is a conductive material 94 having a spongy consistency. Conductive material 94 is physically configured as a direct contact spanning pad. For the concentrically arranged contact in the illustrated embodiment the direct contact spanning pad may be configured in a cylindrical shape. As discharge apparatus 92 is forced down and rotated (in direction 56y) about axis 56x, the spongy material 94 directly contacts, and spans across, all of the individual contacts 56a, 56b and 56c. A conductive material may be foamed in situ to Fill or overfill cap 88. For example, a conductive material may be injected into the cap, and then expand around ribs (such as 90u and 90s) to bold it in place. By overfilling the cap, an excess of material will be forced on to the contacts when the discharge cover is installed on the battery.

As can be seen in FIG. 2, there is provided a discharge apparatus 80 according to one embodiment of the invention. Discharge apparatus 80 includes a discharge cover 82 and a cap 88. Discharge cover 82 includes one or more lip portions for securing under one or more flanges. For example, diametrically opposed lip portions 84a and 84b connect under diametrically opposed equipment flanges 54a and 54b. In one embodiment a locking tab 86 is provided in combination with one lip portion, for example lip portion 84b. When discharge cover 82 is rotated in direction 56c, locking tab 86 comes into contact with flange 54b. A ramp forces locking tab to ride along the top surface of flange 54b until it encounters a recess 54r. Locking tab 86 then snaps back into its original position, being seated in recess 54r, and preventing clockwise rotation. This essentially locks discharge cover 80 onto battery 50. Locking tab 86 can be manufactured with sufficient rigidity so that it can be forced along the ramp by manual pressure. Once locked, tab 86 cannot be unseated manually without destroying part of the cover or the flange. Additional safeguards may be employed to insure the discharge cover remains permanently fastened, or to insure that removal is possible only with special tools or keys. References to a discharge apparatus means an apparatus that is designed to harmlessly dissipate power or energy, i.e. an energy discharge apparatus.

As can be seen in FIG. 3, cap 88 is being installed over contacts 56. Cap 88 serves as a discharge dome to completely enclose contacts 56. A passive battery discharge apparatus 92 is disposed within the cap's internal receiving zone 90, which consists of an open proximal end 90a and a closed distal end 90b. The essential component of discharge apparatus 92 is a conductive material 94 having a spongy consistency. Conductive material 94 is physically configured as a direct contact spanning pad. For the concentrically arranged contact in the illustrated embodiment, the direct contact spanning pad may be configured in a cylindrical shape. As discharge apparatus 92 is forced down and rotated (in direction 56c) about axis 56x, the spongy material 94 directly contacts, and spans across, all of the individual contacts 56a, 56b and 56c. A conductive material maybe foamed in situ to fill or overfill cap 88. For example, a conductive material may be injected into the cap, and then expand around ribs (such as 90u and 90s) to hold it in place. By overfilling the cap, an excess of material will be forced on to the contacts when the discharge cover is installed on the battery.

The spongy consistency of conductive material 94 allows it to resiliently press on all of the individual battery contacts. To provide additional downward force, a resilient member 96 may be provided. For example, a leaf spring or coil spring may be compressingly installed within the discharge dome, to exert a biasing force against the distal end 90b of the dome and against the conductive material 94. Material 94 gets pressed down into the interstices between the contacts as a result of the downward force in combination with the twisting movement. This insures good electrical coupling to all battery contacts.

Electrically, the conductive material 94 serves as a non-switched compressible element that is adapted to passively and safely discharge the battery. In a preferred embodiment the conductive material may be a conductive elastomer or conductive foam. As methods of imparting conductivity to an elastomer, the following two methods are conventionally used: In one known method, an electroconductive polymer composition containing a conductive filler such as powder of metal oxide, carbon black or the like in a polymer thereof is used. In the other known method, an ionic-conductive polymer composition such as urethane rubber, acrylonitrile butadiene rubber, epichlorohydrin rubber or the like is used. Such elastomers are available from Sumitomo Rubber Industries, Ltd. Conductive polyurethane foams are also known to be made using a post-treatment wherein a solvent swells the foam and allows conductive chemicals to interpenetrate the polyurethane. After the solvent is removed, the chemicals remain in the polymer. Such foams are available from Inolex Investment Corporation (Wilmington, Del.).

Generally, suitable conductive materials will possess electrical properties including a volume resistivity in the range of $10^2$ to $10^5$ in ohms-cm. Volume resistivity, or volumetric resistivity, is the electrical resistance between opposite faces of a 1 cm cube or material. It is specified in units of resistance (ohms) multiplied by units of length (cm). In non-limiting examples, certain suitable conductive foams will include:

STATFREE® Foam, Conductive having a volume resistivity ranging between $10^3$ and $10^5$ ohms-cm per ASTM-D-3674-81, available from Desco of Canton, Mass. Conductive fillers include carbon black in crosslinked polyethylene.

Conductive polymer foams as described in U.S. Published Patent Application 2008/0213565, the entire contents of which is incorporated herein by reference thereto.

PLASTAZOTE® LD50CN, Conductive Low Density Polyethylene Foam having a volume resistivity about $10^3$ ohms-cm per ASTM-D991-89, available from Zotefoams of the U.K.

According to the prior art, the following conductive elastomers are commercially available:

CHO-SEAL® and CHO-SIL® Conductive Elastomers having a volume resistivity between about 1 and $10^{-4}$ ohms-cm per MIL-g-83528, available from Chomerics. Conductive fillers include silver (Ag), copper (Cu), nickel (Ni), aluminum (Al), carbon (C), silver-plated copper, nickel coated graphite, silver-plated glass, silver-plated aluminum, and combinations thereof.

Silicon rubber conductive elastomers having a volume resistivity between about 5 and 10 ohms-cm, available from Spectrum Control, Inc. of Fairview, Pa.

Electrically Conductive RTV Silicones having a volume resistivity between about 0.06 and 0.005 ohms-cm, available from Moreau of Lexington, N.C. Conductive fillers include nickel-graphite, silver-glass, silver-nickel, silver-aluminum, silver-copper, silver and combinations thereof. As currently manufactured these conductive elastomers could be used in applications involving batteries that are almost completely discharged. For general purpose applications according to the invention, suitable conductive elastomers would have to be doped at alternate levels to bring their volume resistivity within the range of $10^2$ to $10^5$ ohms-cm.

The present invention is not limited to the illustrative example and may be employed with other conductive materials, or combinations of other conductive materials. All statements herein reciting principles, material properties, and embodiments of tie invention, as well as specific examples thereof, are intended to encompass all structural, electrical and functional equivalents thereof. Additionally, it is intended that such equivalents include both currently known equivalents as well as equivalents developed in the future (i.e., any elements developed that perform the same function, regardless of structure). Furthermore, it is intended that such equivalents include both currently known materials as well as materials developed in the future (i.e., any conductive material developed that performs the same function, regardless of chemical composition).

As demonstrated above, there is a wide range of material choices. For applications requiring higher discharge rates, the thermal properties may be enhanced by providing a heat sink 98 in contact with conductive material 94. For example, conductive material 94 may be glued to heat sink 98 with a conductive adhesive. Other connection methods may be employed, like metal fasteners or clips. Heat sink 98 may be fashioned from a highly conductive material like metal, for example, aluminum. Heat sink 98 may provide other advantages by its placement between spring 96 and conductive material 94. Heat sink 98 allows the biasing force of the spring to be distributed over a large surface area. If a soft conductive material is used, the lower end of the spring may tend to penetrate through, thereby reducing its effectiveness.

As can be seen in FIG. 3, cap 88 is provided with an upper stop 90u and a lower stop 90s. The stops may be divided into several short sections, or may constitute annular rings which encircle the entire cap 88. In one embodiment, cap 88 is produced in two sections, one upper section carrying stop 90u and a lower section carrying lower stop 90s which is integral with discharge cover 82. In other words, the cap is split in a region between stops 90u and 90s. Heat sink can be supplied in a coin shape, for example, a disc having the approximate dimensions of a dime, with a thickness of three nickels. In a practical embodiment, the heat sink was configured as a 3⅛ inch diameter disc of ¼ inch thickness. Spring 96 and conductive material 94 are pre-attached to heat sink 98, collectively forming the passive battery discharge device 92, in this embodiment. With cap and upper stop 90u being removed, device 92 can be installed on to lower stop 90s. Cap and upper stop 90u can then be placed over device 92 and secured with adhesive, ultrasonic welding, or any other suitable means. Cap 88 is concentrically arranged over the battery contact hub, in the illustrated embodiment. Cap 88 and the enclosed passive battery discharge apparatus can be configured for any number of hubs, or any alternate hub configuration. The conductive pad 94 may be sculpted into various shapes or levels, in order to effectively touch all contacts to be discharged.

The completed assembly provides a direct contact (56a, 56b, 56c) spanning pad 94 which resiliently presses on the contacts (56a, 56b, 56c). Additional downward force may be provided by a resilient member 96. Additional heat sinking may be provided by a metal disc 98. Accordingly, a non-switched, compressible energy-dissipating element is provided in the form a pad of conductive elastomer or conductive foam with the cap 88 molded as part of the cover. The discharge cover 80 can be locked in place with varying degrees of security. It should be understood that the elements shown in FIGS. 2 and 3 may be implemented in various forms of hardware, various material choices or combinations thereof. For example, the dome can be alternately shaped, i.e. non-cylindrical, rectangular, or other suitable shapes which can accommodate a resilient member, heat sink and conductive material. The conductive material can be altered to any battery contact configuration, or battery connector configuration. Discharge cover can be designed to mimic the interface of any electrical device, in order to deliver the conductive material so that it can directly span and touch some or all battery power and data contacts.

Having described preferred embodiments for (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An apparatus for discharging a battery having contacts comprising:
   a discharge cover having a cap formed therein to define a discharge apparatus receiving zone; and
   a passive battery discharge apparatus disposed within the cap's receiving zone including a conductive material having a spongy consistency, wherein said conductive material is physically configured as a direct contact spanning pad to resiliently press on to the battery contacts, and wherein said conductive material is electrically configured as a non-switched compressible element to passively and safely discharge the battery.

2. The apparatus of claim 1, wherein said passive battery discharge apparatus further includes a resilient member which exerts a biasing force on said conductive material in a direction out of the cap's receiving zone.

3. The apparatus of claim 1, wherein said passive battery discharge apparatus further includes a heat sink in contact with said conductive material, wherein said heat sink passively dissipates heat generated during battery discharge.

4. The apparatus of claim 3, wherein said passive battery discharge apparatus further includes a resilient member; wherein said heat sink is disposed between said resilient member and said conductive material; whereby said resilient member exerts a biasing force on said heat sink which is distributed over the surface of said conductive material in a direction out of the cap's receiving zone.

5. The apparatus of claim 1, wherein said conductive material has an electrical conductance as measured by volume resistivity in the range of about 100 to about 100,000 ohms·cm.

6. The apparatus of claim 5, wherein said conductive material includes a conductive foam.

7. The apparatus of claim 5, wherein said conductive material includes a conductive elastomer.

8. The apparatus of claim 3, wherein said heat sink is made from metal and the conductive material is made from one of conductive elastomer and conductive foam.

9. The apparatus of claim 3, wherein the cap includes an open proximal end and a closed distal end, wherein said resilient member is disposed within the closed distal end with the heat sink installed at the open proximal end of the cap to compressingly retain said resilient member therein.

10. The apparatus of claim 1, wherein said discharge cover includes a securing device for locking the cover to the battery.

11. An apparatus for passively discharging a battery having contacts comprising:
    a discharge dome to enclose the contacts of the battery to be discharged; and
    a conductive pad disposed within said discharge dome for directly contacting each contact and spanning across said contacts, wherein said conductive pad is made from a material selected from the group consisting of a conductive elastomer, a conductive foam, and combinations thereof;
    wherein said conductive pad comprises a passive discharge device that is devoid of switches, wires and resistors.

12. The apparatus of claim 11, wherein said passive discharge device consists of said conductive pad.

13. The apparatus of claim 11, further comprising a metal heat sink that is thermally coupled to said conductive pad.

14. The apparatus of claim 13, wherein said passive discharge device consists of said conductive pad and said heat sink.

15. The apparatus of claim 11, further comprising a spring disposed within the discharge dome for exerting a biasing force against said conductive pad.

16. The apparatus of claim 15, wherein said passive discharge device consists of said conductive pad and said spring.

17. The apparatus of claim 13, further comprising a spring disposed within the discharge dome for exerting a biasing force against said heat sink and wherein said passive discharge device consists of said conductive pad, said heat sink and said spring.

* * * * *